(12) United States Patent
Tucker

(10) Patent No.: US 9,935,672 B2
(45) Date of Patent: Apr. 3, 2018

(54) MILLIMETRE WAVE CIRCUIT

(71) Applicant: Filtronic Broadband Limited, Sedgefield (GB)

(72) Inventor: Andrew Tucker, Richmond (GB)

(73) Assignee: FILTRONIC BROADBAND LIMITED, Sedgefield (GB)

( * ) Notice: Subject to any disclaimer, the term of this patent is extended or adjusted under 35 U.S.C. 154(b) by 0 days.

(21) Appl. No.: 15/483,485

(22) Filed: Apr. 10, 2017

(65) Prior Publication Data
US 2017/0294936 A1    Oct. 12, 2017

(30) Foreign Application Priority Data

Apr. 11, 2016  (GB) .................................. 1606089.9

(51) Int. Cl.
*H04B 1/40* (2015.01)
*H01P 5/18* (2006.01)

(52) U.S. Cl.
CPC ................. *H04B 1/40* (2013.01); *H01P 5/18* (2013.01)

(58) Field of Classification Search
CPC ..................................... H04B 1/40; H04B 1/16
See application file for complete search history.

(56) References Cited

U.S. PATENT DOCUMENTS

| 6,236,291 B1 | 5/2001 | Sonada et al. |
| 6,249,195 B1 | 6/2001 | Mikami et al. |
| 2001/0015683 A1* | 8/2001 | Mikami ............... H01P 1/20318 333/134 |
| 2002/0017968 A1 | 2/2002 | Hiratsuka et al. |
| 2003/0027530 A1* | 2/2003 | Levitt .................. H01P 1/2138 455/73 |
| 2007/0297398 A1 | 12/2007 | Loyet |

FOREIGN PATENT DOCUMENTS

GB    2 371 415 A    7/2002

OTHER PUBLICATIONS

Search Report (GB1606089.9); dated Jun. 29, 2017.

* cited by examiner

*Primary Examiner* — Tuan H Nguyen
(74) *Attorney, Agent, or Firm* — Howard & Howard Attorneys PLLC

(57) ABSTRACT

A mm wave circuit includes a multiplexer plate having first and second faces, and an output port in the first face. The mm wave circuit also includes a receiver having a receiver input port, the receiver being arranged on the first face and electrically earthed thereto, and an electrically insulating layer covering at least a portion of the first face, the electrically insulating layer having a top face spaced apart from the first face. The electrically insulating layer includes a via extending from the top face to the output port, the via having a via mouth arranged in the top face. The mm wave circuit also includes a receiving antenna at least partly covering the via mouth, the receiving antenna being connected to the receiver input port by a receive line.

15 Claims, 4 Drawing Sheets

MILLIMETRE WAVE CIRCUIT

The present application claims the benefit of pending GB Patent Application Serial No. 1606089.9, filed Apr. 11, 2016, the entire disclosure of which is hereby expressly incorporated by reference.

The present invention relates to a millimeter (mm) wave circuit. More particularly, but not exclusively, the present invention relates to a mm wave circuit including a multiplexer plate having an output port in one face and a receiver electrically earthed to that face, and, an antenna extending from the receiver to partially cover the output port.

Millimeter wave circuits including multiplexer plates are known. The multiplexer plate has an output port in one face which provides a mm wave signal received from an antenna. Typically the circuit further comprises a back plane having an aperture extending therethough. The backplane is arranged on the multiplexer plate such that the aperture lies over the output port of the multiplexer plate. On the other side of the back plane to the multiplexer plate is a receiving antenna which at least partially covers the aperture in the backplane.

In use a microwave signal exits the output port of the multiplexer plate, travels along the aperture in the backplane and is received by the receiving antenna. The receiving antenna passes the received signal to other components on the backplane which process the received signal.

This arrangement has a number of drawbacks. Firstly, the receiving antenna is separated from the output port of the multiplexer plate by the thickness of the backplane. The microwave signal which exits the output port of the multiplexer plate must travel along the length of the aperture in the back plane before it is received by the antenna. This reduces the magnitude of the signal received by the receiving antenna. As the signal which exits the output port of the multiplexer plate is typically very small this further reduction is highly undesirable.

Further, this arrangement is heavy. The weight of the circuit includes the weight of the multiplexer plate and also the weight of the back plane. For applications where weight is important such as avionic applications this is again undesirable.

The present invention seeks to overcome the problems of the prior art.

Accordingly, in a first aspect the present invention provides a mm wave circuit including a multiplexer plate having first and second faces, the multiplexer plate including an output port in the first face;

a receiver having a receiver input port, the receiver being arranged on the first face and electrically earthed thereto;

an electrically insulating layer covering at least a portion of the first face, the electrically insulating layer having a top face spaced apart from the first face, the electrically insulating layer including a via extending from the top face to the output port, the via having a via mouth arranged in the top face; and, a receiving antenna at least partly covering the via mouth, the receiving antenna being connected to the receiver input port by a receive line.

The mm wave circuit according to the invention does not require a backplane. The receiving antenna can therefore be arranged very close to the output port of the multiplexer which improves electrical performance. Further, the absence of a back plane reduces the weight of the circuit, compared to circuits which have the receivers on a separate back plane. The mm wave circuit according to the invention is therefore lighter and more suitable for use in avionic applications.

Preferably the receive line extends along the top face of the electrically insulating layer.

Preferably the receive line is a portion of an electrically conducting layer on the insulating layer.

Preferably the first face of the multiplexer plate comprises a ridge, the receiver being arranged on the ridge.

Preferably the ridge is dimensioned such that the receiver input port is substantially coplanar with the top face of the electrically insulating layer.

Preferably the receiver is arranged in a second via in the insulating layer.

Preferably the multiplexer plate comprises an input port in the first or second faces, a transmitter arranged on the same face and earthed thereto; and, a transmit antenna at least partially covering the input port, the transmit antenna being connected to the transmitter by a transmit line.

Preferably the multiplexer plate is grounded to an earthing plate.

Preferably the multiplexer plate further comprises an antenna port having a common antenna connected thereto.

The present invention will now be described by way of example only and not in any limitative sense with reference to the accompanying drawings in which FIGS. 1(*a*) and 1(*b*) show multiplexer plates in vertical cross section;

Figure 1A:
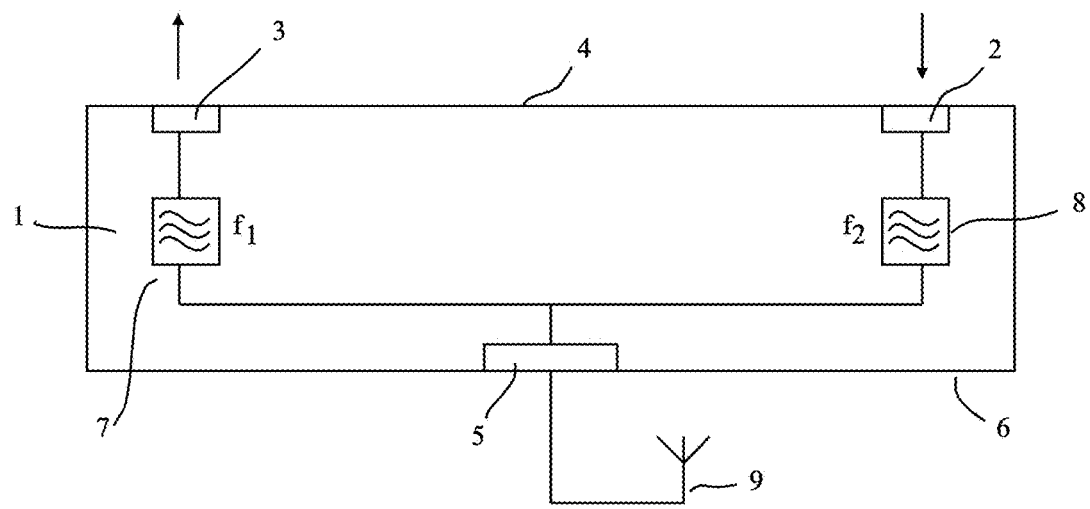
Figure 1B:
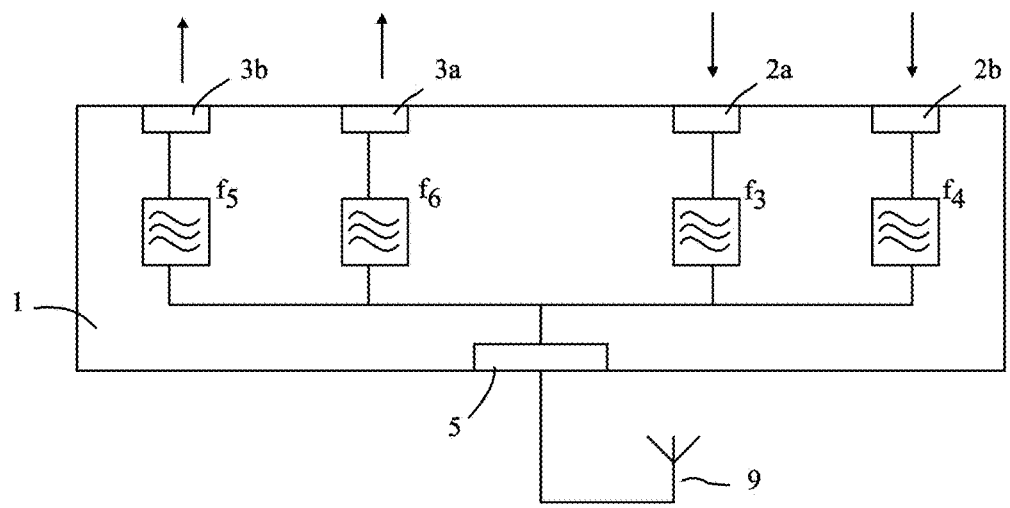

Shown in FIG. 1(*a*) is a typical example of a multiplexer plate 1. Such multiplexer plates 1 are known in the art and so the properties of such plates are only briefly summarised.

The multiplexer plate 1 comprises input and output ports 2,3 in a first face 4 and an antenna port 5 in the second face 6. Connected between the antenna port 5 and the output port 3 is a waveguide 7. The waveguide 7 acts as a filter having a bandpass around $f_1$. Connected between the antenna port 5 and input port 2 is a further waveguide 8. The further waveguide 8 also acts as a filter 8 but has a bandpass around $f_2$. The bandpasses of the two filters 7,8 do not overlap. The filters 7,8 typically comprise microwave resonant cavities. Waveguide structures for filtering at microwave frequencies are known in the art.

In use a signal is provided at the input port 2 at frequency $f_2$. This passes through the filter 8 connected to the input port 2, then to antenna port 5, and hence to a common antenna 9. It does not pass through the filter 7 connected to the output port 3. Similarly, a signal received by the common antenna 9 at $f_1$ is passed to the antenna port 5 and then to the output port 3. It does not pass through the filter 8 to the input port 2.

FIG. 1(*b*) shows a further embodiment of a multiplexer plate 1. The multiplexer comprises two input ports 2*a*, 2*b* and two output ports 3*a*,3*b*. Signals at $f_3$ and $f_4$ presented to the input ports 2*a*, 2*b* are passed to the antenna port 5 and so to the common antenna 9. Signals at $f_5$ and $f_6$ received by the common antenna 9 are passed to the antenna port 5 and then to the output ports 3*a*, 3*b*. As can be seen a multiplexer plate 1 is also a demultiplexer plate depending on the direction signals are passing through the plate. The terms multiplexer plate and demultiplexer plate are used interchangeably. Plates with only one input port 2 and one output port 3 are also referred to as multiplexer/demultiplexer plates in the art.

Figure 2:
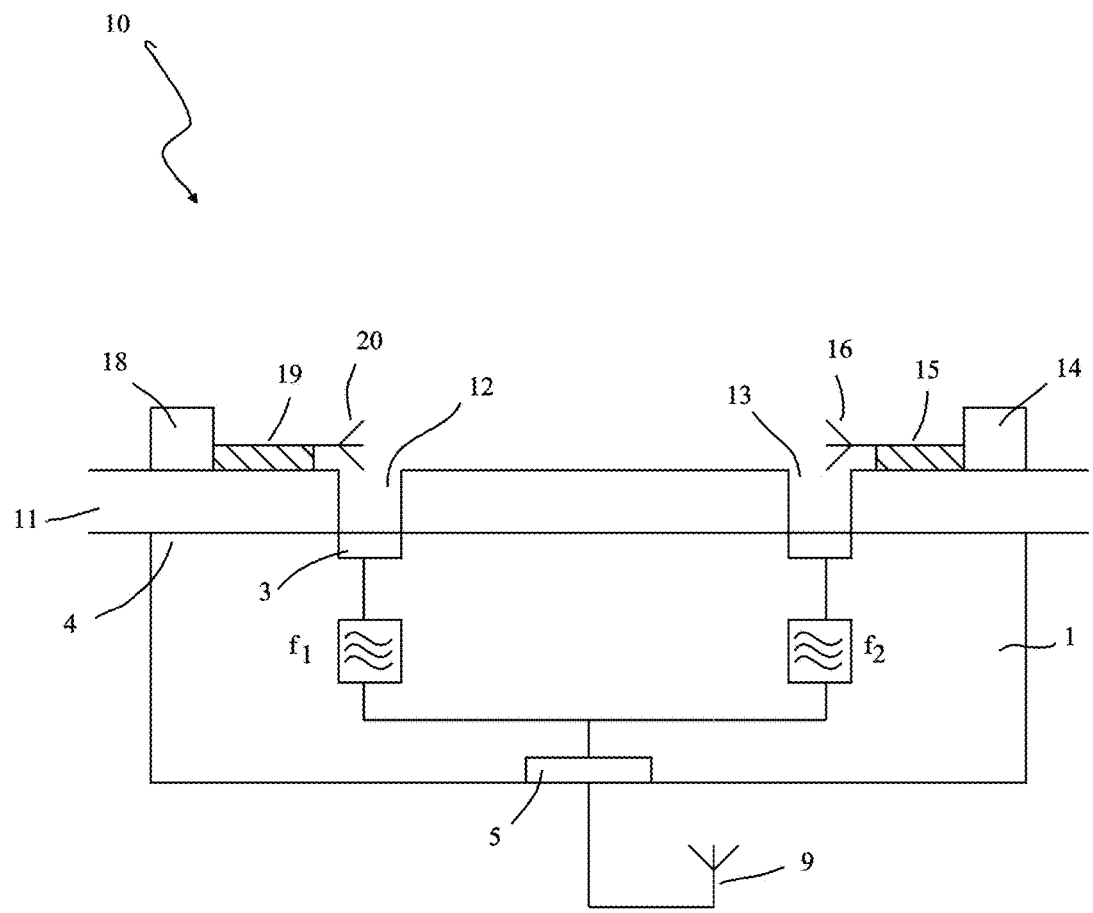
FIG. 2 shows a known mm wave circuit in vertical cross section.

Shown in FIG. 2 is a known mm wave circuit 10, in particular a mm wave transceiver. The millimeter wave transceiver 10 comprises a multiplexer plate 1 as previously described. Connected to the first face 4 of the multiplexer plate 1 is an electrically conducting backplane 11. The backplane 11 has first and second vias 12,13 extending therethrough. The backplane 11 is arranged such that the first via 12 covers the output port 3 of the multiplexer plate 1 and the second via 13 covers the input port 2 of the multiplexer plate 1 as shown.

Arranged on the back plane 11 on the opposite side of the backplane 11 to the multiplexer plate 1 is a transmitter 14. Connected to the transmitter 14 by a transmit line 15 is a transmit antenna 16. The electrically conducting transmit line 15 typically runs along the top of an insulating layer 17 on the backplane 11. The transmit antenna 16 partially covers the second via 13. Also arranged on the backplane 11 is a receiver 18. Connected to the receiver 18 by a receive line 19 is a receive antenna 20. The receive line 19 also runs long the top of the insulating layer 17. The receive antenna 20 partially covers the first via 12 as shown. A common antenna 9 is connected to the antenna port 5.

In use the transmitter 14 provides a signal to the transmit antenna 16 at a mm wave frequency $f_2$. The transmit antenna 16 radiates the signal along the second via 13 to the input port 2 of the multiplexer plate 1. From here the signal passes to the common antenna 9 as previously described. If a mm wave signal at $f_1$ is received by the common antenna 9 this is passed to the output port 3 as previously described. From here the mm wave signal passes along the first via 12 and is received by the receive antenna 20. The receive antenna 20 passes the signal to the receiver 18. The receiver 18 processes the signal in some way. Typically, the receiver 18 can be a low noise amplifier or alternatively/additionally a demultiplexer to separate a data signal from a mm wave carrier signal. Both the transmitter 14 and receiver 18 are earthed to the backplane 11.

The known mm wave transceiver 10 of FIG. 2 requires both a multiplexer plate 1 and a backplane 11. This increases the weight of transceiver 10. Further, because the receive antenna 20 is separated from the associated output port 3 of the multiplexer plate 1 by the thickness of the backplane 11 then the signal received by the receive antenna 20 is reduced.

Figure 3:
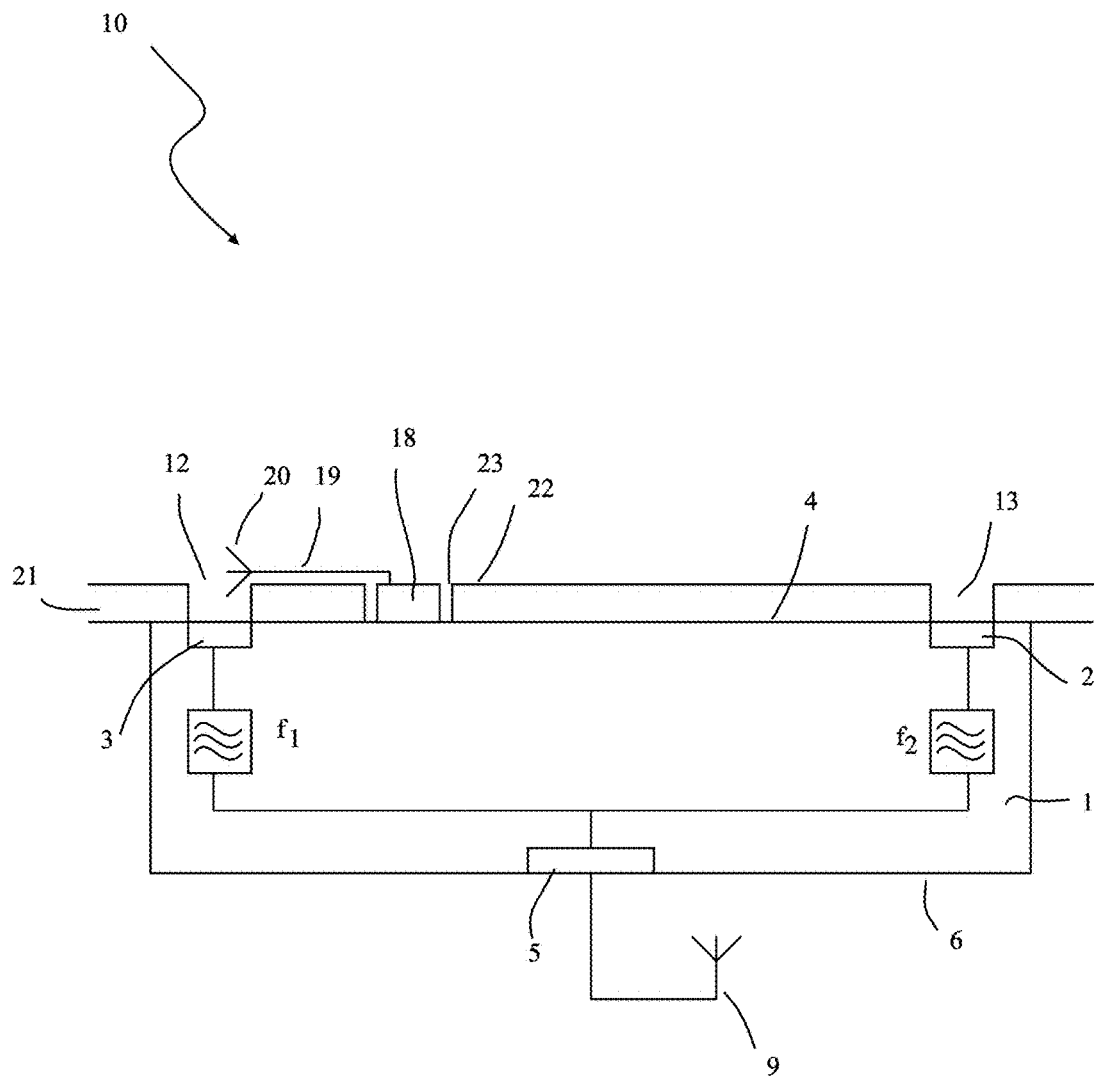
FIG. 3 shows a first embodiment of a mm wave circuit according to the invention in vertical cross section; and, FIG. 4 shows a further embodiment of a mm wave circuit according to the invention in vertical cross section.

Shown in FIG. 3 is an embodiment of a mm wave circuit 10 according to the invention. The mm wave circuit 10 comprises a multiplexer plate 1 having first and second faces 4,6. The first face 4 comprises input and output ports 2,3. The second face 6 comprises an antenna port 5. A common antenna 9 is connected to the antenna port 5. The operation of the multiplexer plate 1 is as described previously.

An insulating layer 21 covers the first face 4. The insulating layer 21 has a top face 22 spaced apart from the first face 4 of the multiplexer plate 1. Extending through the insulating layer 21 from a via mouth in the top face 22 is a first via 12. The insulating layer 21 is arranged so that the first via 12 lies over the output port 3 of the multiplexer plate 1 as shown.

A receiver via 23 extends through the insulating layer 21. Arranged on the first face 4 of the multiplexer plate 1 in the receiver via 23 is a receiver 18. The receiver 18 is earthed to the multiplexer plate 1. A receive antenna 20 partially covers the mouth of the first via 12 and extends by means of a receive line 19 to a receive port of the receiver 18.

In contrast to the mm wave circuit 10 of FIG. 2 no backplane 11 is a required. The receiver 18 is directly connected to the multiplexer plate 1 and uses the multiplexer plate 1 as an earth. As no backplane 11 is required the mm wave circuit 10 according to the invention is considerably lighter than known equivalent mm wave circuits. Further, the receive antenna 20 can be arranged more closely to the output port 3 of the multiplexer plate 1 than in known mm wave circuits 10. As described above because the received signal does not need to pass along a via in a backplane 11 this improves the electrical performance of the mm wave circuit 10.

Figure 4:
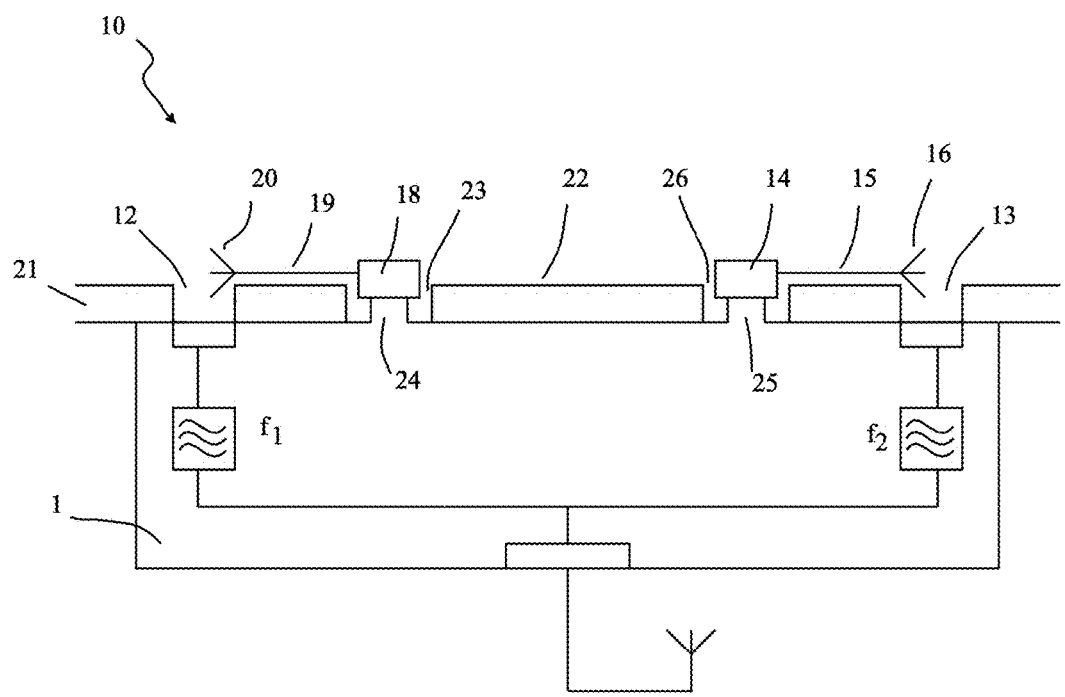

Shown in FIG. 4 is a further embodiment of a mm wave circuit 10 according to the invention. In this embodiment the mm wave circuit is a mm wave transceiver. The mm wave transceiver comprises a receiver 18 having a receiver input port. Connected to the receiver input port is a receive antenna 20 which partially covers the mouth of the first via 12. As can been seen, the receiver 18 is arranged on a ridge 24 extending from the first face 4. The ridge 24 raises the receiver 18 from the first face 4 so that the receiver input port is substantially coplanar with the top face 22 of the insulating layer 21. This has the advantage that the receive line 19 can be planar and so easier to manufacture.

The mm wave transceiver 10 of FIG. 4 further comprises a transmitter 14. The transmitter 14 provides a mm wave signal. The transmitter typically comprises a modulator which modulates a mm wave carrier signal with a data signal. The transmitter 14 is arranged on a ridge 25 in a transmitter via 26 of the insulating layer 21. Extending from the transmitter 14 to a transmit antenna 16 along the top face 22 of the insulating layer 21 is a transmit line 15. The transmit antenna 16 partially covers the mouth of the second via 13 extending from the top face 22 of the insulating layer 21 to the input port 2 of the multiplexer plate 1.

Typically, an electrically conducting layer is arranged on the insulating layer. The transmit and receive lines 15,19 are manufactured from this layer by creating a series of small vias which extend through the conducting layer. These small vias are arranged in parallel lines. The transmit and receive lines 15,19 are the portions of the conducting layer between the parallel lines.

The multiplexer plate 1 must itself be earthed. This is achieved by earthing the multiplexer plate to an earthing plate. The earthing plate can for example be a portion of the body of a vehicle.

The invention claimed is:

1. A mm wave circuit comprising
    a multiplexer plate having first and second faces, the multiplexer plate comprising an output port in the first face;
    a receiver having a receiver input port, the receiver being arranged on the first face and electrically earthed thereto;
    an electrically insulating layer covering at least a portion of the first face, the electrically insulating layer having a top face spaced apart from the first face, the electrically insulating layer comprising a via extending from the top face to the output port, the via having a via mouth arranged in the top face; and,
    a receiving antenna at least partly covering the via mouth, the receiving antenna being connected to the receiver input port by a receive line.

2. A mm wave circuit as claimed in claim 1, wherein the receive line extends along the top face of the electrically insulating layer.

3. A mm wave circuit as claimed in claim 2, wherein the receive line is a portion of an electrically conducting layer on the insulating layer.

4. A mm wave circuit as claimed in claim 3, wherein the first face of the multiplexer plate comprises a ridge, the receiver being arranged on the ridge.

5. A mm wave circuit as claimed in claim 4, wherein the ridge is dimensioned such that the receiver input port is substantially coplanar with the top face of the electrically insulating layer.

6. A mm wave circuit as claimed in claim 5, wherein the receiver is arranged in a receiver via in the insulating layer.

7. A mm wave circuit as claimed in claim 6, wherein the multiplexer plate comprises an input port in the first or second faces, a transmitter arranged on the same face and earthed thereto; and, a transmit antenna at least partially covering the input port, the transmit antenna being connected to the transmitter by a transmit line.

8. A mm wave circuit as claimed in claim 7, wherein the multiplexer plate is grounded to an earthing plate.

9. A mm wave circuit as claimed in claim 8, wherein the multiplexer plate further comprises an antenna port having an antenna connected thereto.

10. A mm wave circuit as claimed in claim 1, wherein the first face of the multiplexer plate comprises a ridge, the receiver being arranged on the ridge.

11. A mm wave circuit as claimed in claim 10, wherein the ridge is dimensioned such that the receiver input port is substantially coplanar with the top face of the electrically insulating layer.

12. A mm wave circuit as claimed in claim 1, wherein the receiver is arranged in a receiver via in the insulating layer.

13. A mm wave circuit as claimed in claim 1, wherein the multiplexer plate comprises an input port in the first or second faces, a transmitter arranged on the same face and earthed thereto; and, a transmit antenna at least partially covering the input port, the transmit antenna being connected to the transmitter by a transmit line.

14. A mm wave circuit as claimed in claim 1, wherein the multiplexer plate is grounded to an earthing plate.

15. A mm wave circuit as claimed in claim 1, wherein the multiplexer plate further comprises an antenna port having an antenna connected thereto.

\* \* \* \* \*